(12) United States Patent
Hurlburt

(10) Patent No.: US 6,557,661 B1
(45) Date of Patent: May 6, 2003

(54) FRONT AXLE SUSPENSION MECHANISM FOR UTILITY VEHICLES

(75) Inventor: Joseph C. Hurlburt, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/044,930

(22) Filed: Jan. 15, 2002

(51) Int. Cl.[7] .............................................. B60K 17/22
(52) U.S. Cl. ................. 180/266; 280/788; 280/124.116
(58) Field of Search .................. 280/124.116, 124.128, 280/128.179, 788; 180/265, 266

(56) References Cited

U.S. PATENT DOCUMENTS

| | | | |
|---|---|---|---|
| 4,706,770 A | 11/1987 | Simon | 180/24.02 |
| 5,046,577 A | 9/1991 | Hurlburt | 180/266 |
| 5,129,477 A | 7/1992 | Hurlburt | 180/265 |
| 5,476,150 A | * 12/1995 | Hurlburt et al. | 180/53.7 |
| 6,089,340 A | 7/2000 | Galli | 180/53.1 |
| 6,105,983 A | 8/2000 | Will | 280/93.514 |

* cited by examiner

Primary Examiner—Kevin Hurley
Assistant Examiner—L. Lum
(74) Attorney, Agent, or Firm—John William Stader

(57) ABSTRACT

A utility vehicle includes a bogey beam pivotally connected to the chassis of the vehicle. The bogey beam supports the front axle at a forward end thereof and is connected to a suspension strut at the rearward end thereof. The pivotal connection of the bogey beam to the vehicle chassis is at a point intermediate of the forward and rearward ends. The suspension strut takes the place of a middle axle from a three-axle utility vehicle configuration to permit the construction of a two-axle embodiment of the utility vehicle without requiring a significant change in the configuration of the vehicle. Loads placed on the load bed of the vehicle are still distributed to the front axle through the connection of the chassis with the bogey beam.

11 Claims, 5 Drawing Sheets

FRONT AXLE SUSPENSION MECHANISM FOR UTILITY VEHICLES

FIELD OF THE INVENTION

The present invention relates generally to off-road motor vehicles, such as utility or recreational vehicles, and more particularly, to mechanism for suspending the front axle of utility vehicles.

BACKGROUND OF THE INVENTION

Small off-road vehicles such as utility or recreational vehicles are becoming popular for recreational and other general purpose off-road usage. Such utility vehicles can be found in U.S. Pat. No. 4,706,770. These utility vehicles have found usage on golf courses and at sporting events, and are particularly adaptable for utilization on a farm. This type of flexibility in the wide variety of uses necessitates a vehicle that is highly flexible, highly maneuverable and the like. This demands a vehicle that will afford a high degree of maneuverability and ease of steering.

Steering characteristics of known utility vehicles provide poor turning performance. Known utility vehicles have turning clearance circles having a diameter greater than twenty-one feet. The use of independent front wheel suspension mechanisms on known utility vehicles, coupled with the mounting of the rack and pinion systems on the frame of the vehicle, introduces minor king pin rotations as the steering tires ride over ground undulations. Such construction reduces steering precision and can accelerate the wear of the tires on the steering axle.

Some utility vehicles have three axles, front and rear axles, and a middle axle that is typically positioned slightly forwardly of the rear axle. In other utility vehicle embodiments, only front and rear axles are provided. In the embodiment of a utility vehicle shown in co-pending U.S. patent application Ser. No. 09/841,001, filed on Apr. 25, 2001, entitled "Bogey Beam Axle Support For Utility Vehicles", the middle axle is mounted on a bogey beam that extends longitudinally between the front and middle axles and is pivotally connected at an intermediate point to the chassis. To maximize manufacturing efficiencies, it would be desirable to utilize this bogey beam construction in a two axle utility vehicle embodiment and utilize the bogey beam as a mechanism for suspending the front axle for improved ride and steering characteristics.

It is therefor desirable to provide a utility and recreational vehicle that overcomes the disadvantages of the known prior art utility vehicles.

SUMMARY OF THE INVENTION

Accordingly, an important object of the present invention is to provide a suspension mechanism for the front axle of a two-axle utility vehicle by using a bogey beam mechanism developed for support of the middle axle of a larger utility vehicle embodiment.

It is another object of this invention to provide a suspension mechanism that will substitute for the middle axle to create a two-axle utility vehicle embodiment out of a three-axle configuration.

It is an advantage of this invention to enhance manufacturing efficiencies by utilizing a three-axle utility vehicle configuration to provide a two-axle utility vehicle embodiment. It is a feature of this invention to provide a suspension mechanism for the front axle of a utility vehicle having a bogey beam configuration.

It is another feature of this invention that a load placed into the load bed of the utility vehicle will be distributed to the bogey beam for distribution to the front axle.

It is still another advantage of this invention that the ride characteristics of a utility vehicle are improved, particularly under load bearing conditions.

It is a further object of this invention to provide a front axle suspension mechanism utilizing a bogey beam mechanism for an off-road vehicle that is durable in construction, inexpensive to manufacture, carefree in maintenance, easy to assemble, and simple and effective in use.

These and other objects, features, and advantages are accomplished according to the present invention by providing a utility vehicle having a bogey beam pivotally connected to the chassis of the vehicle. The bogey beam supports the front axle at a forward end thereof and is connected to a suspension strut at the rearward end thereof. The pivotal connection of the bogey beam to the vehicle chassis is at a point intermediate of the forward and rearward ends. The suspension strut takes the place of a middle axle from a three-axle utility vehicle configuration to permit the construction of a two-axle embodiment of the utility vehicle without requiring a significant change in the configuration of the vehicle. Loads placed on the load bed of the vehicle are still primarily distributed to the front axle through the connection of the chassis with the bogey beam.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
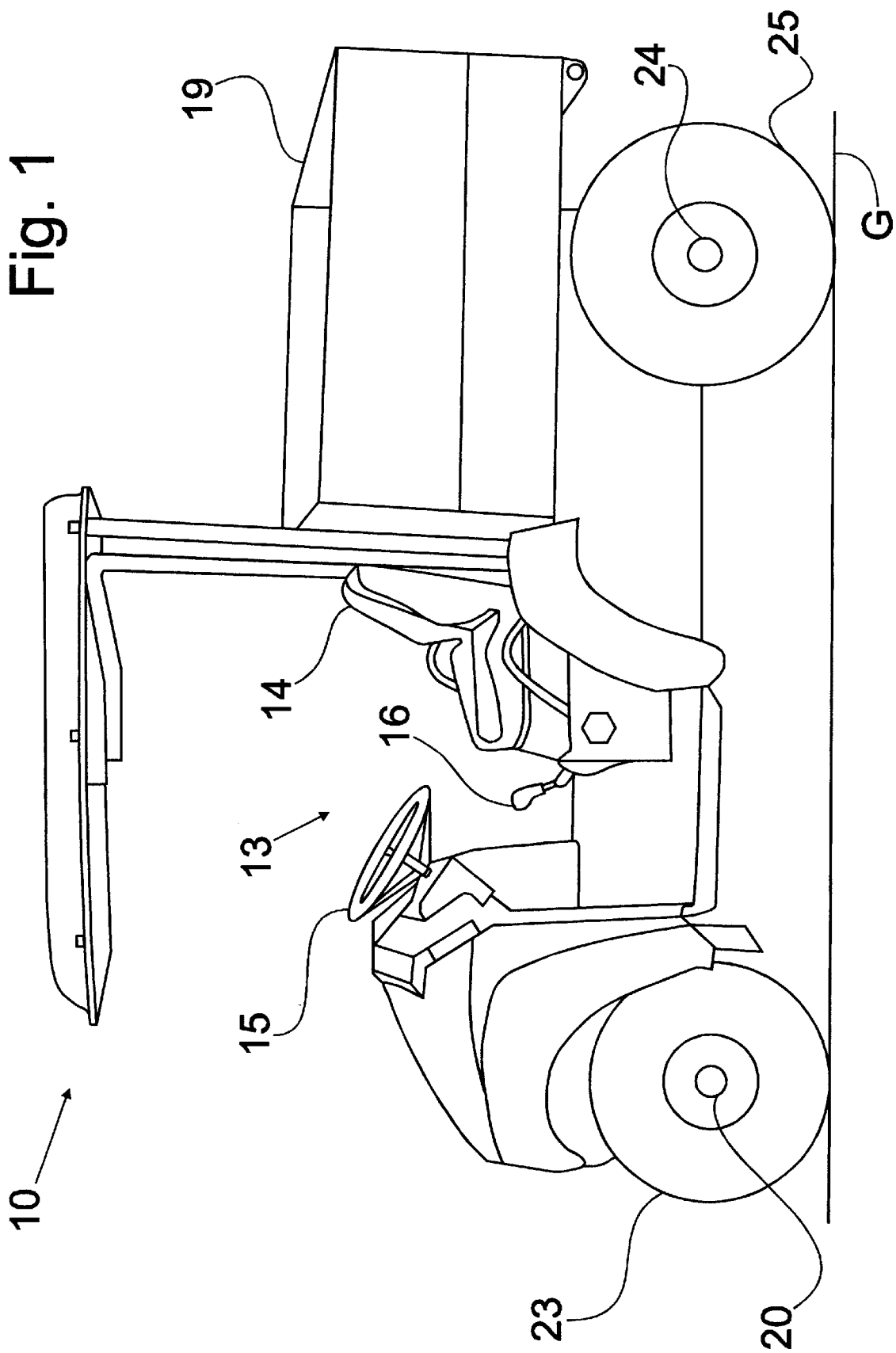
FIG. 1 is side perspective view of a utility vehicle incorporating the principles of the present invention.
Figure 2:
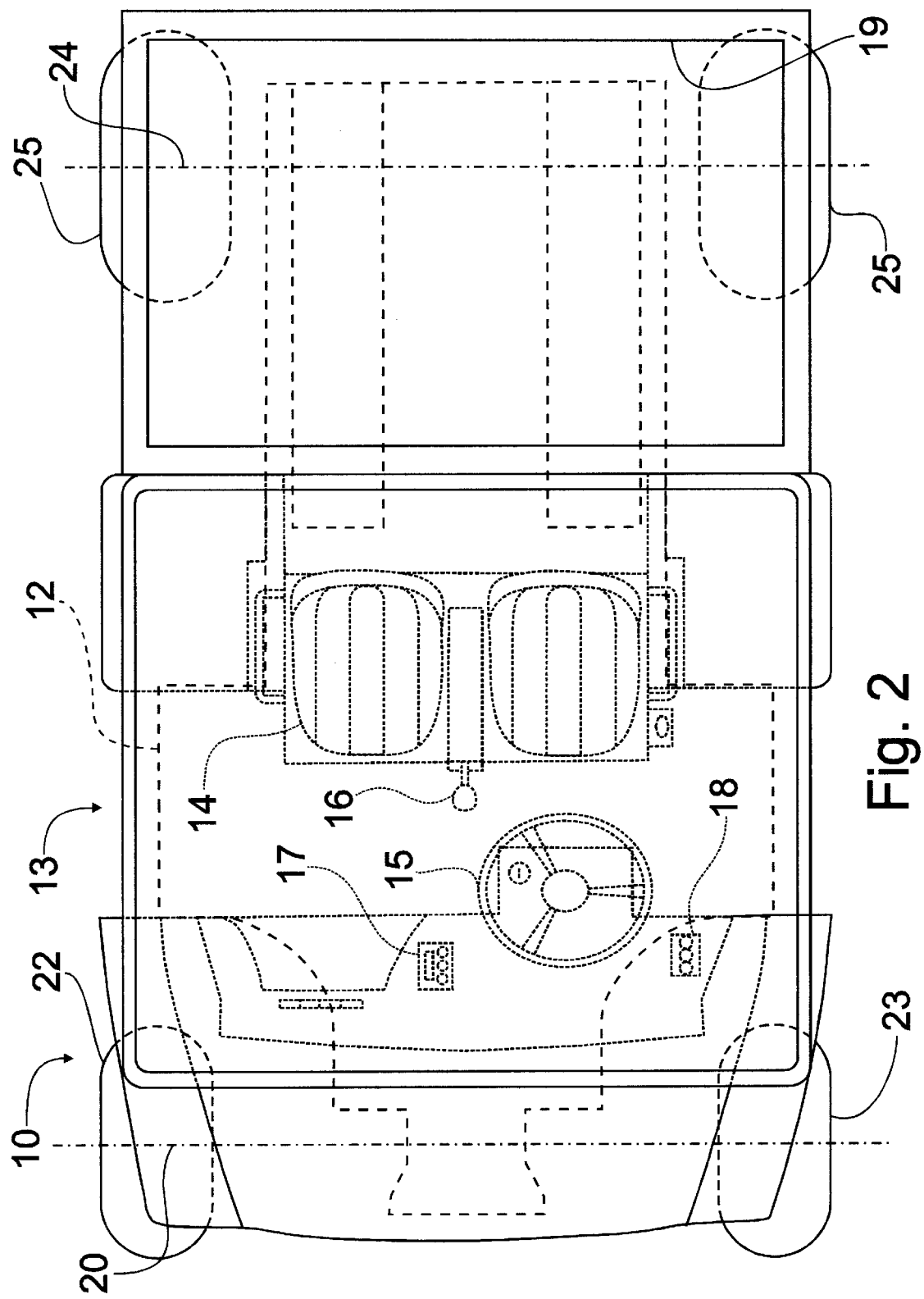
FIG. 2 is a top plan view of the utility vehicle of FIG. 1, the seats and control apparatus being shown in dashed lines, the frame and axles being shown in phantom.
Figure 3:
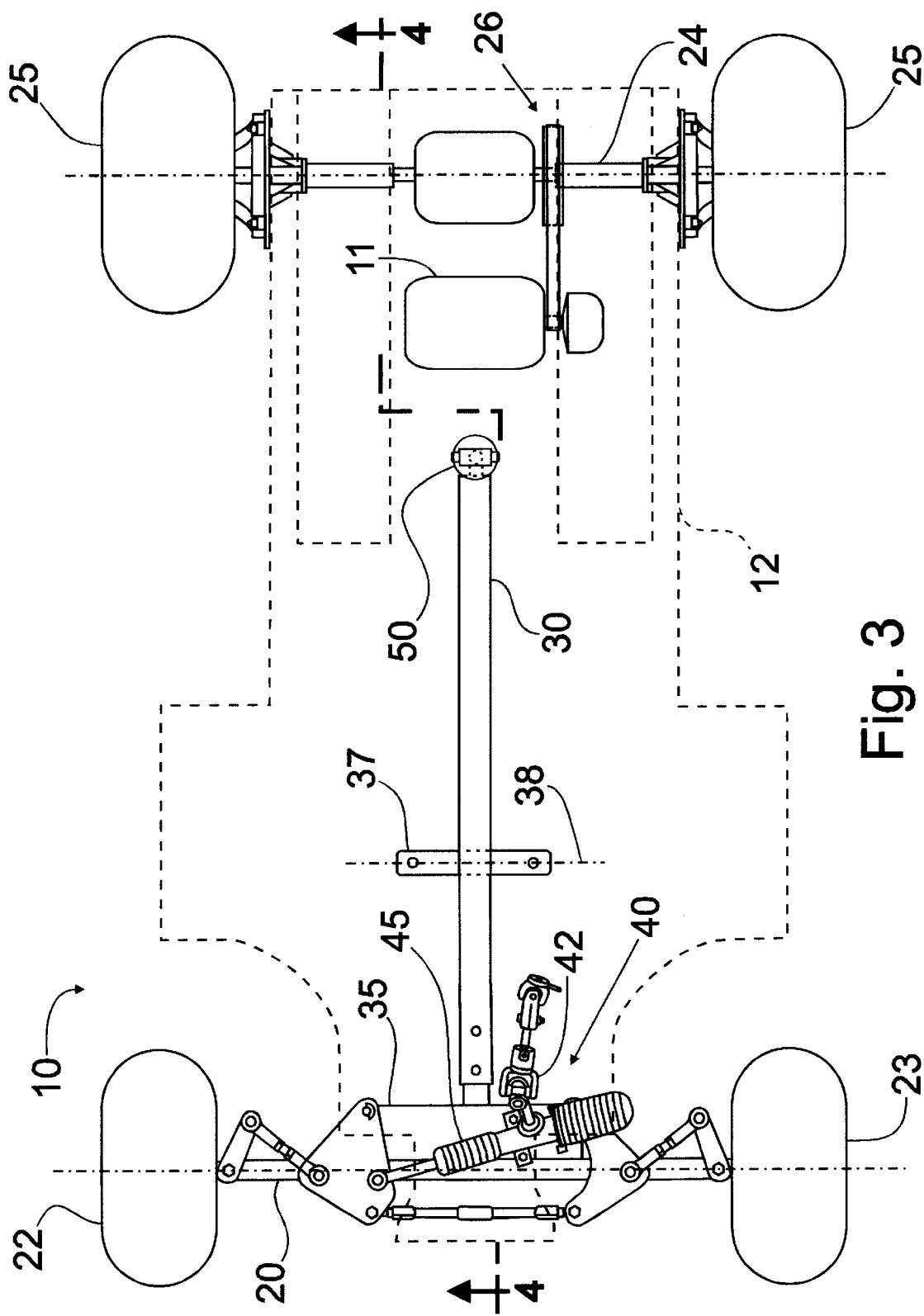
FIG. 3 is a top plan view of the frame and drive mechanism with the chassis removed for purposes of clarity.
Figure 4:
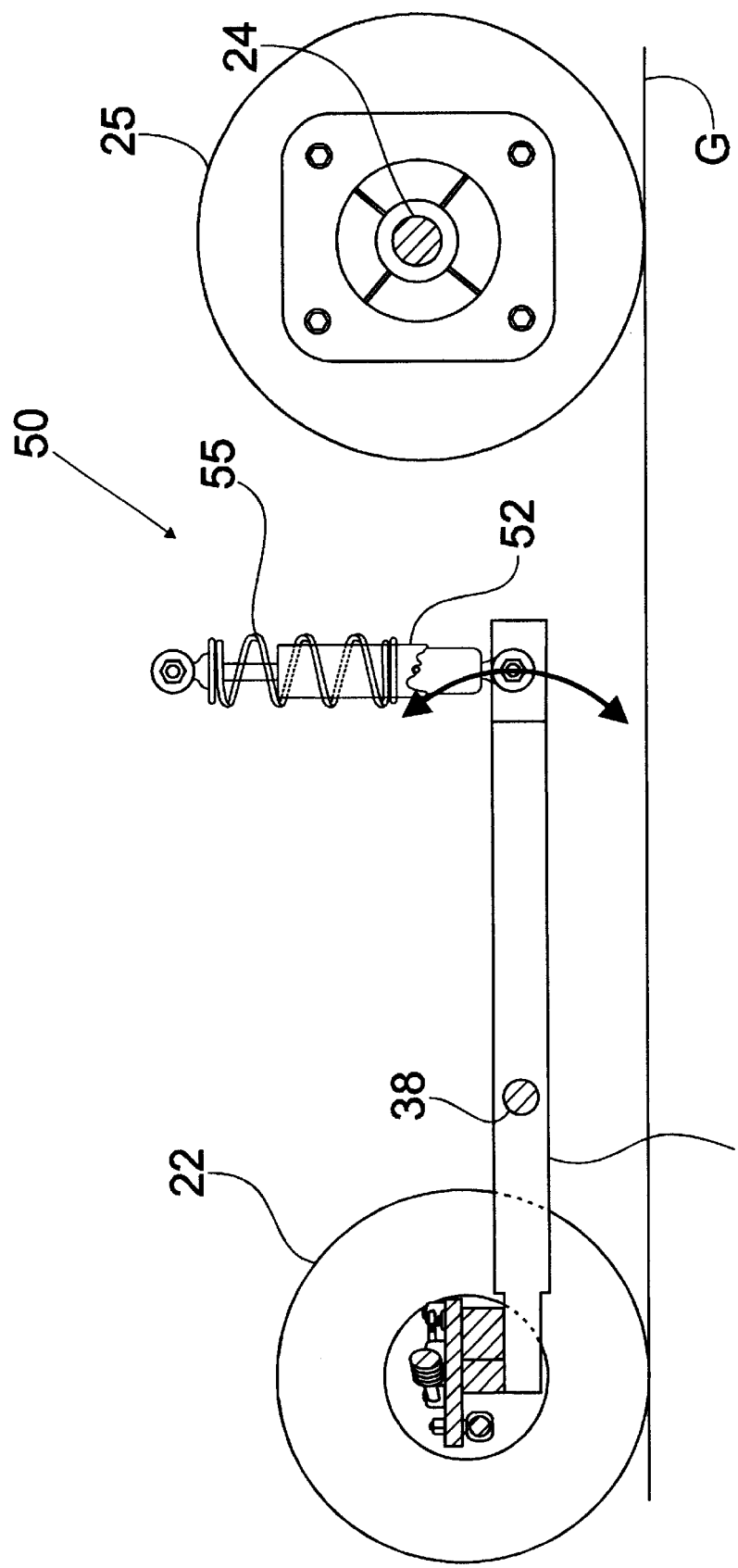
FIG. 4 is an enlarged cross-sectional view of the utility vehicle taken along lines 4—4 of FIG. 3 to show the drive mechanism and the orientation of the bogey beam supporting the front steering axle and the middle drive axle.

Referring to FIGS. 1–3, a utility vehicle incorporating the principles of the present invention can best be seen. Any left and right references are used as a matter of convenience and are determined by standing at the rear of the vehicle and facing forwardly into the direction of travel.

The utility vehicle 10 includes a frame 12 supported above the ground G by a pair of steered wheels 22, 23 mounted on a front steering axle 20 and by a pair of driven wheels 25 mounted on a rear drive axle 24. In one embodiment of the utility vehicle shown in co-pending U.S. patent application Ser. No. 09/841,001, filed on Apr. 25, 2001, and entitled "Bogey Beam Axle Support For Utility Vehicles", the description portion of which are incorporated herein by reference, a middle drive axle is also provided with a pair of opposing support wheels. The frame 12 supports an operator compartment 13 including seats 14 for the comfort of the operator and control apparatus, such as a conventional steering wheel 15 and a gear shift lever 16. A throttle control 17 and a brake control 18, along with other conventional control devices, are also included within the operator compartment 13 for the control of the vehicle 10. The frame 12 also supports a load bed 19 rearwardly of the operator compartment 13 over the rear drive axle 24 to carry cargo over the surface of the ground G.

Referring now to FIG. 3, the frame 12 with the axles 20, 24 mounted thereon can best be seen. The rear drive axle 24 is rotatably supported on the frame 12 and is powered by a drive mechanism 26 powered by an engine 11 supported by the frame 12. The front steering axle 20 is attached to the forward end of the bogey beam 30 which is formed as a mounting member 35 for the steering axle 20. The bogey beam 30 is pivotally connected to the frame 12 by a pivot assembly 37 positioned beneath the operator compartment 13 to provide an oscillation of the bogey beam 30 about the transverse pivot axis 38. Accordingly, the front steering axle 20 and the rearward end of the bogey beam generally oscillate in opposing vertical directions on opposite ends of the bogey beam 30 due to the pivotal mounting thereof by the pivot assembly 37. The pivot assembly 37 can be formed as a simple pin pivotally connecting the bogey beam 30 to the frame 12 of the vehicle 10 to define the transverse pivot axis 38, as is shown in the drawings.

The rearward end of the bogey beam 30 where the three-axle configuration of the utility vehicle 10 would have the middle axle located is connected to a generally vertical suspension strut 50 to offset the forces exerted on the bogey beam 30 by the front axle 20. Accordingly, the suspension strut 50 provides suspension for the front axle 20 as the vertical movement of the front axle 20 relative to the chassis 12 is cushioned by the suspension strut 50. The suspension strut 50 is preferably connected to the frame or chassis 12 at the upper end thereof and to the rearward end of the bogey beam 30 at the lower end thereof. The suspension strut 50 is preferably a gas cylinder 52 having a conventional concentric spring 55 mounted thereon.

Figure 5:
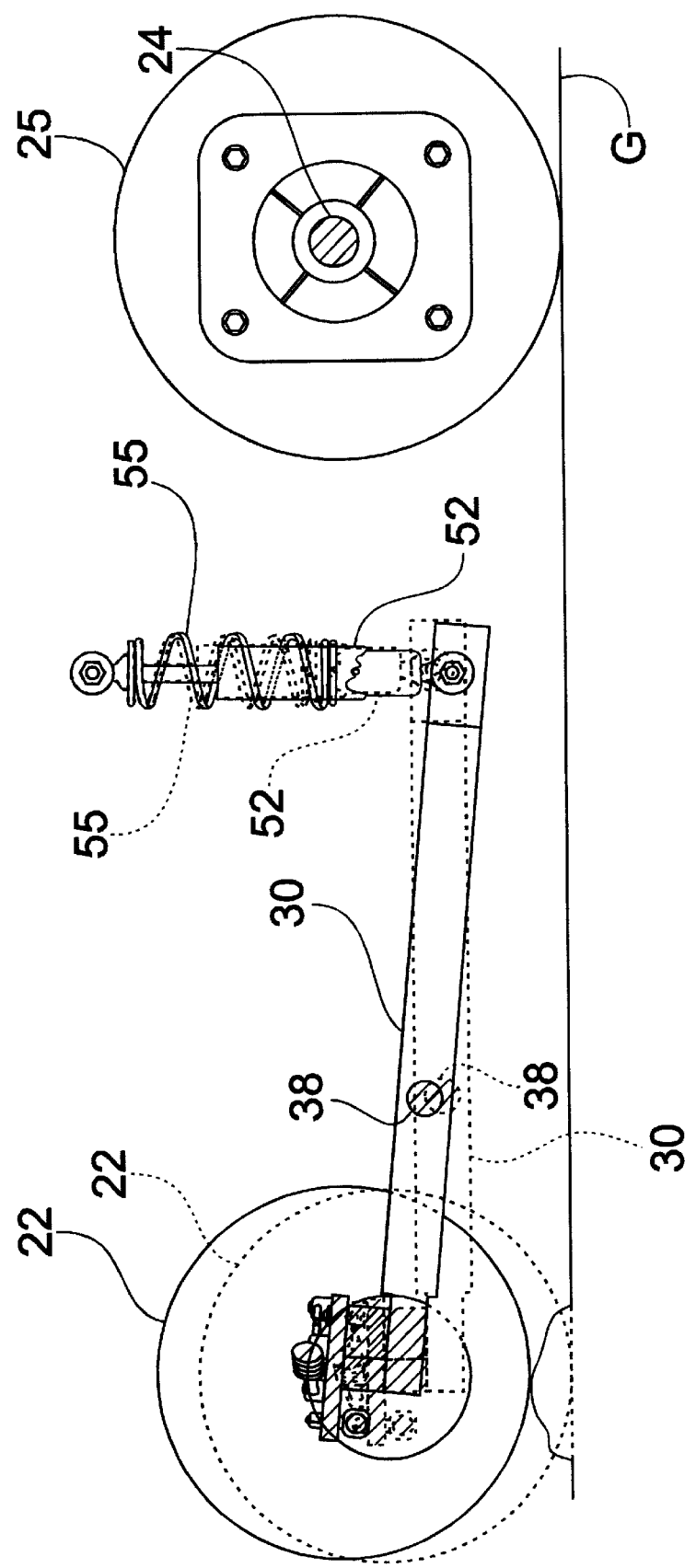
FIG. 5 is an enlarged cross-sectional view of the utility vehicle similar to FIG. 4, but depicting the movement of the bogey beam when the front axle encounters an undulation in the ground surface.

The suspension strut 50 serves as a front axle suspension member biasing the front axle 20 and the bogey beam 30 into a predetermined position. When the front axle 20 goes over a bump in the ground surface, as is depicted in FIG. 5, or falls into a depression in the ground surface, the generally vertical movement of the front axle 20 is cushioned by the suspension strut 50 which, in turn, exerts a biasing force on the rearward end of the bogey beam 30 to urge the bogey beam 30 and the front axle 20 back into the predetermined position.

Any load placed in the load bed 19 will be transferred to the rear axle 24 through the mounting thereof with the frame 12 and to the bogey beam 30 via the pivot assembly 37 and suspension strut 50. The weight carried by the front axle 20 is the difference between the loads at the pivot assembly 31 and the suspension strut 50. The steering characteristics will not be impacted by any load placed into the load bed 19, as the rear axle 24 cannot overpower the front steering axle 20.

The front steering axle 20 is operatively associated with a steering mechanism 40 to effect turning movement of the steered wheels 22, 23. The steering mechanism 40 is actuated through manipulation of the steering wheel 15 by the operator through the universal connecting linkage 42. The steering mechanism 40 includes a rack and pinion assembly 45 which includes a conventional pinion (not shown) rotatably associated with the steering wheel 15 and a conventional rack that is linearly movable in conjunction with the rotation of the pinion in a known manner. Further details of the steering mechanism 40 can be found in co-pending U.S. patent application Ser. No. 09/804,154, filed on Mar. 13, 2001, and entitled "Enhanced Steering Mechanism for Utility Vehicles", the descriptive contents of which are incorporated herein by reference.

The manufacture of a three-axle utility vehicle as shown in co-pending U.S. patent application Ser. No. 09/841,001, filed on Apr. 25, 2001, entitled "Bogey Beam Axle Support for Utility Vehicles" will lend itself to the manufacture of the two-axle configuration depicted in FIGS. 1–5. The chassis 12 can be appropriately shortened, bringing the rear axle 24 closer to the rearward end of the bogey beam 30, but the general construction of the vehicle support structure would remain essentially unchanged with the suspension strut 50 replacing the middle axle of the three-axle configuration to cooperate with the rearward end of the bogey beam 30. In addition, the suspension strut 50 provides a cushioning for the vertical movement of the front axle 20 to enhance the riding characteristics of the vehicle 10.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A utility vehicle comprising:
   a frame supported by a front axle having a pair of steered wheels pivotally mounted thereon;
   a rear axle mounted to the frame and having a pair of support wheels mounted thereon;
   a longitudinally extending bogey beam pivotally connected to said frame at an intermediate point and having a forward end connected to said front axle and a rearward end, said intermediate point being located longitudinally between said forward end and said rearward end; and
   a resilient member interconnecting said rearward end of said bogey beam and said frame to oppose vertical movement of said front axle relative to said frame.

2. The utility vehicle of claim 1 wherein said resilient member comprises a suspension strut operable to bias said bogey beam into a predetermined position such that any vertical movement of said front axle from said predetermined position results in a biasing force being applied to said bogey beam by said suspension strut to return said bogey beam and said front axle to said predetermined position.

3. The utility vehicle of claim 2 wherein said suspension strut includes a gas cylinder having a concentric spring mounted thereon.

4. The utility vehicle of claim 3 wherein said rear axle is operably connected to a drive mechanism to power a rotational movement of said support wheels, said front wheels being operably connected to a steering mechanism to control the pivotal movement of said steered wheels.

5. A suspension mechanism for a utility vehicle having a frame, a front axle supported on the frame and including a pair of steerable wheels mounted thereon, a rear axle supported from the frame rearwardly of said front axle, comprising:
- a longitudinally extending bogey beam pivotally connected to said frame at an intermediate point and having a forward end connected to said front axle and a rearward end, said intermediate point being located longitudinally between said forward end and said rearward end; and
- a resilient member interconnecting said rearward end of said bogey beam and said frame to oppose vertical movement of said front axle relative to said frame.

6. The suspension mechanism of claim 5, wherein said resilient member comprises a suspension strut operable to bias said bogey beam into a predetermined position such that any vertical movement of said front axle from said predetermined position results in a biasing force being applied to said bogey beam by said suspension strut to return said bogey beam and said front axle to said predetermined position.

7. The suspension mechanism of claim 6, wherein said suspension strut includes a gas cylinder having a concentric spring mounted thereon.

8. In a utility vehicle having a frame, a front axle supported on the frame and including a pair of steerable wheels mounted thereon, a rear axle supported from the frame rearwardly of said front axle, an improved suspension mechanism comprising:
- a longitudinally extending bogey beam pivotally connected to said frame at an intermediate point and having a forward end connected to said front axle and a rearward end, said intermediate point being located longitudinally between said forward end and said rearward end; and
- a resilient member interconnecting said rearward end of said bogey beam and said frame to oppose vertical movement of said front axle relative to said frame.

9. The utility vehicle of claim 8, wherein said resilient member comprises a suspension strut operable to bias said bogey beam into a predetermined position such that any vertical movement of said front axle from said predetermined position results in a biasing force being applied to said bogey beam by said suspension strut to return said bogey beam and said front axle to said predetermined position.

10. The utility vehicle of claim 9, wherein said suspension strut includes a gas cylinder having a concentric spring mounted thereon.

11. The utility vehicle of claim 10 wherein said rear axle is operably connected to a drive mechanism to power a rotational movement of said support wheels, said front wheels being operably connected to a steering mechanism to control the pivotal movement of said steered wheels.

* * * * *